Feb. 14, 1967 C. E. SCHOU 3,303,901
HYDROSTATIC TRANSMISSION
Filed Dec. 31, 1964 3 Sheets-Sheet 1

INVENTOR
CARL E. SCHOU
Strauch, Nolan & Neale
ATTORNEYS

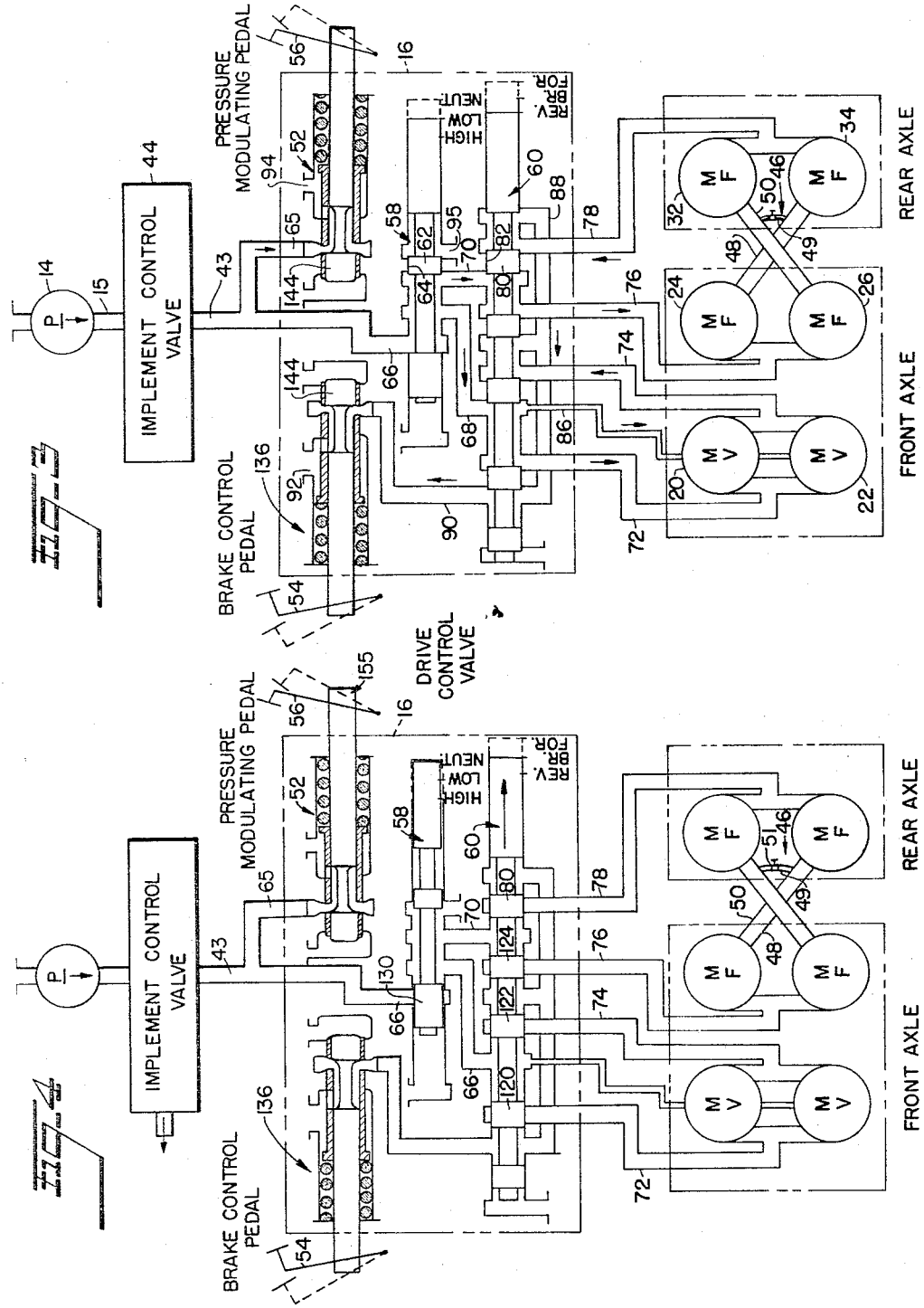

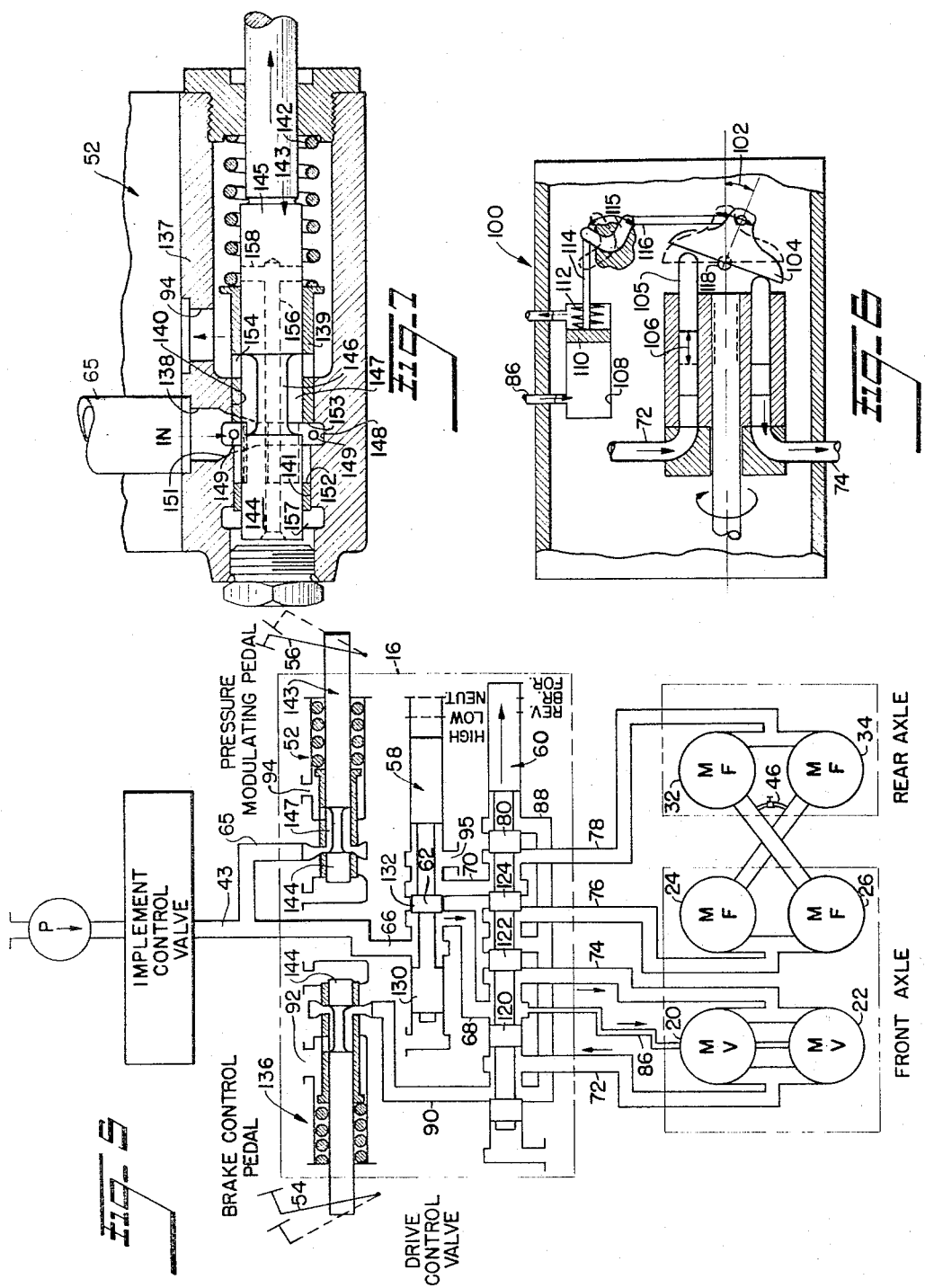

United States Patent Office 3,303,901
Patented Feb. 14, 1967

3,303,901
HYDROSTATIC TRANSMISSION
Carl E. Schou, Bloomfield Hills, Mich., assignor to Rockwell-Standard Corporation, Pittsburgh, Pa., a corporation of Delaware
Filed Dec. 31, 1964, Ser. No. 422,652
15 Claims. (Cl. 180—23)

The present invention relates to vehicle four wheel drive arrangements, and more particularly to a hydrostatic transmission and associated brake and control system.

Hydrostatic transmissions, because of such inherent favorable qualities as ease of control and response particularly at low speeds, instant braking and reversing capabilities and design simplicity, have become increasingly popular in drives for work-type vehicles where speed control rather than maximum speed is critical, such as tractors, combines, crawlers and front-end loaders. Hydrostatic transmissions now known in the art possess two major disadvantages: high component and system cost and poor non-uniform efficiency throughout their operating speed ranges.

In addition, because hydrostatic transmissions have become associated primarily with work-type vehicles, it is paramount that they be able to provide adequate traction at all times. For example, in such vehicles as tractor-shovels which are called upon to operate as all-weather vehicles and over uneven terrain, poor traction can greatly reduce the vehicle's efficiency, resulting in wheel spinning and poor starting characteristics at such critical times as crowd and breakout. The need for adequate traction is also acute when the workload distribution is such that the load is primarily concentrated on one end of the vehicle and so heavy as to slightly raise the wheels of the end opposite the load concentration. The problem can be further aggravated should the vehicle be called upon to perform its work functions in soft sloping terrain. At present these difficulties can be minimized by use of sophisticated four wheel drives and devices for maintaining uniform traction in the drive wheels, but this requires much additional expense.

The present invention therefore contemplates and has as its major object provision of a novel hydrostatic transmission and associated four wheel drive arrangement which is less costly than present designs, is more uniformly efficient throughout its work operating range, and is capable of providing adequate traction at all times throughout its work operating range.

A further object of the invention is to provide a novel combination of hydraulic components for producing an efficient, infinitely variable four wheel drive and hydrostatic transmission assembly.

Another object of the invention is the provision of novel hydraulic circuitry which provides the transmission with the ability to selectively distribute power and torque to individual wheels as needed to assure adequate vehicle traction throughout its work operating range.

A further object of this invention is to provide a novel, all hydraulic power brake which eliminates the need for friction braking of any type in a vehicle.

It is a further object of this invention to provide a hydrostatic transmission of simplified construction, comparatively less expensive to manufacture, and capable of providing a high relatively uniform efficiency throughout its work operating range.

It is a further object of this invention to provide a novel pressure modulating control valve within the hydrostatic transmission which maintains system pressure substantially in proportion to the developed engine power and torque.

These and further objects will presently become apparent by reference to the appended claims and as the description proceeds in connection with the accompanying drawings wherein:

FIGURE 3 is a schematic diagram showing the hydrostatic transmission of FIGURE 2 set to operate in the low range and in reverse;

FIGURE 4 is a schematic diagram showing the hydrostatic transmission of FIGURE 2 set in neutral and with the hand parking brake engaged;

FIGURE 5 is a schematic diagram showing the hydrostatic transmission of FIGURE 2 set to operate in the high range in a forward direction;

FIGURE 6 is a fragmentary horizontal section diagrammatically showing a variable displacement hydraulic motor; and FIGURE 7 is an enlarged fragmentary view in horizontal section showing either the pressure modulating control valve or the brake control valve of the assembly.

Similar reference numbers are applied to corresponding parts throughout all figures of the drawings.

Figure 1:
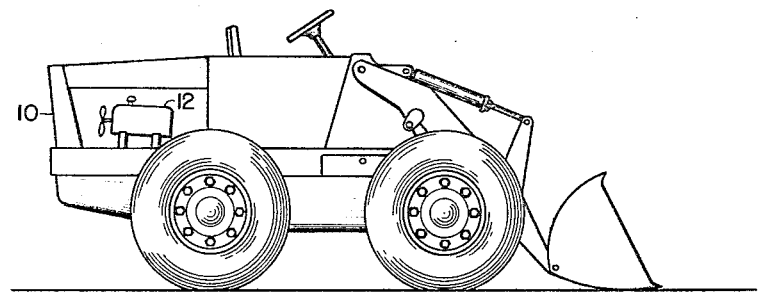
FIGURE 1 is a side view elevation of a work-type vehicle such as a tractor shovel or front-end loader to which the invention is applied in a preferred embodiment.
Figure 2:
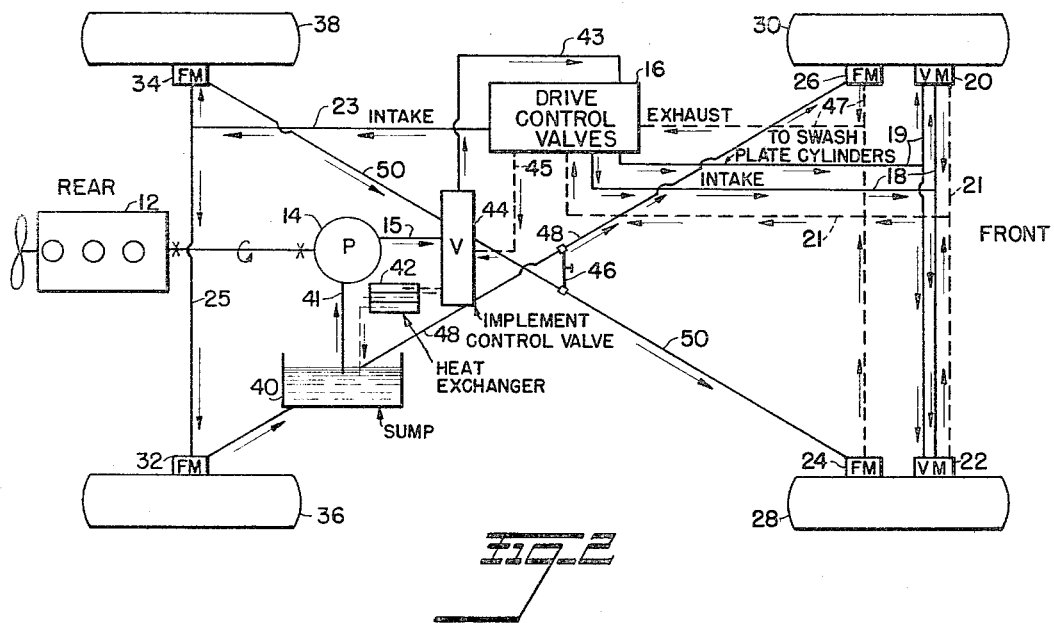
FIGURE 2 is a diagrammatic plan view of the vehicle of FIGURE 1 showing vehicle parts and associated drive components.

Referring now to FIGURES 1 and 2, the hydrostatic transmission system adopted for use with tractor shovel 10 may be used in conjunction with either conventional gasoline or diesel engines 12 and the drive comprises a fixed displacement pump 14 (though variable displacement pumps, at a higher cost, may be used), a drive control unit 16, a conduit 15 connecting pump 14 to the drive control unit 16 through implement control valve 44, conduits 18 and 19 connecting the unit 16 to two infinitely variable hydraulic front wheel motors 20 and 22, and an exhaust conduit 21 connected between motors 20 and 22 and unit 16. A pair of fixed capacity hydraulic motors 24 and 26 are located at the front wheels 28 and 30 respectively and fixed capacity hydraulic motors 32 and 34 are located at rear wheels 36 and 38 respectively. A supply line comprising conduits 23 and 25 and cross conduits 48 and 50 provides a hydraulic connection between unit 16 and all of motors 24, 26, 32 and 34. A flow compensator 46, later to be described in detail connects cross conduits 48 and 50, and a return conduit 47 connects the fixed capacity motor system back to unit 16. Pump 14, in addition to being capable of supplying all the hydraulic fluid required by the motors for various speed operations, is of sufficient capacity to provide the fluid required for operation of the various vehicle implements which in the instance of the tractor-shovel control operation of the loading bucket. A hydraulic supply line 43 connects unit 16 with the implement control unit 44, and a return conduit 45 connects units 16 and 44.

A sump 40 provides a fluid reservoir for the system and is connected to the inlet of pump 14 by conduit 41. The returned exhaust fluid from implement control valve 44 passes through heat exchanger 42 wherein it is cooled before delivery into the sump.

It will be observed from FIGURE 2 that the four fixed displacement hydraulic motors 24, 26, 32 and 34, one of which is located at each of the four wheels, are diagonally series connected in pairs. Flow compensator 46 is located between the cross-connecting conduits 48 and 50 in order to provide the correct power flow and to maintain proper differential action when the vehicle is turning. As will be explained later, this series diagonal-connecting of the fixed displacement motors provides adequate traction throughout the vehicle's work operating speed range.

In FIGURES 3-5, the drive control unit 16 is shown in enlarged detail. It comprises four main valves, the slidable pressure modulating valve 52 and brake control valve 136 controlled by foot pedals 56 and 54 respectively, the slidable range selector valve 58 which may be controlled either automatically or manually, and the slidable manually controlled forward-reverse valve 60. For purposes of this disclosure, the range selector valve 58 will be assumed to be automatic. All of these valves are slidable spool valves.

Pressure modulating foot pedal 56 is suitably mechanically linked as by a treadle (not shown) to the engine throttle, and it serves the dual control function of modulating system pressure and controlling vehicle speed.

Range selector valve 58, as indicated in FIGURES 3-5, may be shifted to establish the transmission in two operating ranges, the low range and high range, or establish a neutral position. For purposes of this specification, the low range shall be defined as that range of operation where both the fixed capacity and variable capacity motors, that is to say all hydraulic motors, are hydraulically supplied with power to drive the vehicle. This low range will exist in the speed range of just above zero to five miles per hour, and shall be synonomous with the term "work operating range."

High range shall be the range of operation where only the variable capacity motors 20 and 22 at the front wheels shall be driven. This high range will be synonomous with the term "transport range" and shall exist in the speed range from approximately five miles per hour to the maximum vehicle speed of about 12 miles per hour. Variations in the size of components may permit variations of these speed operating ranges.

The transmission is capable of providing the same speed ranges whether operating in forward or reverse. In the high range, fluid sufficient to continuously lubricate the fixed capacity motors is circulated at approximately zero pressure so that power losses due to such flow is minimal at high operational speeds.

FIGURE 3 shows the range selector valve 58 set in the low range position. This is characterized by setting valve spool 62 against valve seat 64 thereby allowing fluid to flow from conduit 66 which is open to supply line 43 through the valve to conduits 68 and 70. The forward-reverse valve 60 is set in FIGURE 3 to the reverse position as characterized by setting valve spool 80 against valve seat 82.

Fluid flow from the pump to various motors with the controls set as in FIGURE 3 is from the pump 14 and open implement control valve through conduit 43 branching to conduit 65 to the pressure modulating valve 52 and to conduit 66, through to the range selector valve 58 to conduits 68 and 70 which lead to the forward-reverse valve 60. Since the forward-reverse valve is here set in the reverse position, flow to the two variable motors 20 and 22 will be from conduit 68 through conduit 72 (which corresponds to line 18 in FIGURE 2) and through the swashplate control conduit 86 (which corresponds to line 19 in FIGURE 2). Flow to the four fixed motors in FIGURE 3 will be from conduit 70 to conduit 76 and through the cross conduits 48 and 50. Conduit 74 (which corresponds to line 21 in FIGURE 2) and conduit 78 (which corresponds to line 47 in FIGURE 2) serve as exhaust lines for return fluid flow from the motors through conduits 88 and 90 through drain port 92 to the fluid reservoir.

Variable capacity hydraulic motors and fixed capacity hydraulic motors of the same size are generally distinguished by their swashplates. In the fixed capacity motor the swashplate is set to a predetermined fixed angle, whereas the swashplate angle 102 in a variable capacity motor 100 (FIGURE 6) is capable of variation in response to system fluid pressure changes. As shown in FIGURE 6, fluid from conduit 86 entering control cylinder 108 of motor 100 acts upon control piston 110, and changes in system fluid pressure caused by load variation at the wheels, braking, or accelerating of the vehicle are sensed by conduit 86 and transmitted to piston 110. For example an increase in system pressure, as due to braking, moves piston 110 to the right against the compression resistance of spring 112, and through pivoted links 114, 115 and 116 swings the swashplate 104 clockwise about its trunnion 118, thereby increasing the swashplate angle 102 and increasing the stroke length of motor pistons 105 as indicated at 106. This increase in the length of the piston stroke which varies proportionally to the angle of inclination of the swash plate 104, results in increased volumetric displacement of fluid by the motor. In a fixed motor a fixed cam angle is substituted for the trunnion at 118, and the motor otherwise operates in the usual manner.

It will be seen that the variable motors 20 and 22 quickly respond to load variations by sensing system fluid pressure changes. Viewing an increase in load as increased drag at the wheels, the variable motors are able to sense the increased demand for torque through their shafts and slow down in an effort to develop the additionally demanded torque. In slowing down the motor passes fluid at a reduced rate, causing fluid system pressure to rise as the pump, not yet affected by the load increment, continues to pass fluid into the system at its same rate. The resultant rise in system pressure is sensed through conduit 86 and applied to piston 110 for causing the swashplate angle 102 to increase, thereby compensatively increasing the volumetric capacity and torque output of the variable motors.

Referring again to FIGURE 3, it is seen that fluid flows from conduit 76 to front wheel fixed capacity motors 24 and 26. As all of the fixed motors are hydraulically linked in pairs in a series and diagonal connection, fluid from motor 24 flows through conduit 48 to motor 34, and fluid from motor 26 is transmitted to motor 32 via conduit 50. It is this series and diagonal hydraulic connection in combination with the flow compensator 46 which contributes to make available the best possible traction at all times.

Flow compensator 46 consists essentially of a conduit 49 connecting the cross conduits 48 and 50, and a manually adjustable needle valve or like restriction 51 in conduit 49. The direction and amount of fluid flow through conduit 49 are dependent upon the pressure differential between conduits 48 and 50, and this pressure differential depends on the torque demand imposed upon the individual fixed displacement motors. While this pressure differential is present in some degree more or less at all times, so that there is constant compensation, it is most accented during steering and turning of the vehicle. The compensator 46 maintains substantially equal power fluid supply pressure in both conduits 48 and 50 and hence provides uniform torque at the wheels. However, even in the tightest turns, there is only a small exchange of fluid between the conduits to attain the correct power flow and to maintain proper differential action.

In practice the ratio of diameter of conduit 48 or 50 to conduit 49 is preferably about 8 to 1, which can be reduced by the needle valve to 16 to 1.

FIGURE 4 shows the range selector valve 58 set to neutral and the forward-reverse valve 60 set to the parking brake position. In this condition of operation, spool 130 closes conduit 66, and conduits 72, 74, 76 and 78 are closed with respect to the motors by valve spools 120, 122, 124, and 80 respectively, thereby inhibiting fluid flow to and from all six hydraulic motors and locking all wheels.

Thus with either the valve 60 in parking brake position or the valve 58 in neutral position there is no fluid flow to any of the hydraulic motors, and no power and torque is developed at the motors and the flow system, discounting inertial forces, assumes a static condition minimizing power losses and heat build-up in the system due to unnecessary fluid circulation. Since flow is blocked to and through unit 16, return flow takes place from implement control valve 44 through the heat exchanger 42 directly into the sump 40.

FIGURE 5 shows the drive control unit 16 set to have the vehicle operate forwardly in the high range. Range selector valve 58 is moved to high range position with spool 62 positioned against valve seat 132 blocking fluid flow to conduit 70. Thus all fluid flow is directed to the variable capacity motors 20, 22 through conduit 68 to the forward-reverse valve 60 which is set in the forward position so that spools 124 and 80 almost block conduits 76 and 78 respectively from receiving return fluid from conduit 88. Fluid flow is permitted to the variable motors 20, 22 through conduits 74 and 86, and flow from conduit 68 to conduit 72 blocked by spool 120. Conduit 72 now serves as the return flow conduit. Spool 120 unblocks conduit 72 to permit return flow into conduit 90 and to port 92.

Thus when the valve 58 is in the high range position of FIGURE 5, the valve 60 is positioned for forward drive only the front wheel motors 20 and 22 are driven oppositely to FIGURE 3 by fluid entering through conduit 74, with swash plate control fluid entering as before through conduit 86. No drive power is imparted to motors 24, 26, 32 or 34 which idle in the high range.

The various hydraulic motors are suitably mechanically linked to the wheels. The four motors located at the front wheels, that is one variable capacity motor and one fixed capacity motor per front wheel, are preferably connected through separate pinion gears to a common ring gear. Thus the motors at the front wheels per side must rotate at the same speed. The fixed capacity motors located at the rear wheels are geared independently of each other and independently of the front wheels, though it is noted that the fixed capacity motors at the rear wheels are hydraulically linked to the fixed capacity motors at the front wheels through the series-diagonally connecting conduits 48 and 50. It is this hydraulic linkage which assures a maximum tractive effort at all times by selectively and automatically distributing power and torque to the wheels with greater traction.

Assume that all hydraulic motors and the pump were to have the same capacity though they need not be so related. Then the fixed and variable capacity front wheel motors, even if operating at the same rate, need not, and indeed will not, possess the same operating volumetric displacement capacity because of the ability of the variable motors to continuously vary their swashplate angle over a wide pressure range while the swashplate angle in the fixed motors remains constant. In the low range, maximum torque will exist when the fixed motors and variable motors, i.e. all motors of FIGURE 2, operate at the same maximum swashplate angle of approximately 14 to 19 degrees. By means of varying the swashplate angle of the variable motors it is possible to continuously vary the torque output of the motors from this low range maximum torque condition to the low range minimum torque condition where the swashplate angle of the variable motors approaches zero degrees while the swashplate angle of the fixed motors remains constant. In the high range of selector valve 58 the fixed capacity motors are cut out of the system by the range selector valve as will appear and torque output is then related only to the output of the two variable motors. Maximum torque will exist when the swashplate angle is at the maximum setting and minimum torque will exist when the swashplate angle approaches zero degrees. Continuous variation between these limits is made possible by controllably modulating system pressure as will later be explained.

This arrangement extends the continuously variable operating feature of the variable motors to approximately twice its normal operating range. Also this provides in the work operating range, the range in which the vehicle is called upon to perform its various work functions, the full capacity of the four fixed motors plus such capacity of the variable motors as needed, whereas in the transport range where this full capacity of all the motors is not needed only the full capacity of the two variable capacity motors is available to the operator. Thus the power output of the transmission is tailored to the expected demands to be made upon the vehicle in the various operating ranges.

For purposes of this disclosure the present transmission shall be described as the drive for a tractor-shovel (see FIGURE 1) in order to best illustrate how torque and power are distributed to provide the best possible traction at all times for the vehicle within its work operating range, but it should be understood that the transmission is readily adaptable to other worktype vehicles, and that the description herein is merely illustrative and not meant to be a limitation on adaptability of the transmission to other vehicles.

In the work operating range of a tractor shovel the distribution of torque and power in a typical loading operation must be made in three distinct steps: crowd, breakout, and rated load.

Under the condition of crowd, which exists when the tractor shovel is pressing down and against the load, all power and torque is distributed to the rear wheels and the front wheels may well be as low as at zero pressure. Spinning of the front wheels is eliminated by the fact that the fixed motors of both the front and rear wheels are hydraulically connected in series, and the fixed and variable motors of the front wheels are indirectly mechanically connected through the gear trains of the final drive. The motors, being load responsive, deliver power and torque in proportion to the reactive force distribution at the wheels. When no load is sensed at the front wheels, all available power and torque is delivered to the rear axle. If the front wheels are slightly touching the ground, the power and torque distribution is proportional to the reactive forces developed at the various wheels. Thus a load distribution of 10% at the front axle and 90% at the rear wheels during crowd would result in a like distribution of power and torque. In addition, assuming the vehicle to be operating diagonally on a slight slope so that the reactive forces per axle were not divided equally per wheel, the transmission, because it is load responsive through the motors at the individual wheels as previously explained, will selectively distribute power and torque in proportion to the reactive forces at the individual wheels assuring the best possible traction under the prevailing environment.

At breakout, which exists when the bucket of the tractor shovel is loaded and the vehicle is attempting to raise the bucket preparatory to transport of the load, the rear wheels may well be as low as at zero pressure. Thus the power and torque distributed to the rear axle during crowd is transferred to the front axle. Again as no power and torque is distributed to the unloaded rear axle (at zero pressure) wheel spinning of the rear wheels is eliminated and power and torque is distributed to the wheels possessing best traction.

At rated load, which exists when the bucket of the tractor shovel is loaded and elevated, the power and torque distribution varying in proportion to the reactive forces at the individual wheels will vary from 50% to 75% at the front axle and 25% to 50% at the rear axle.

In the transport or high range, all power and torque is distributed to the front axle through the two variable capacity motors only, the four fixed motors idling, but should traction be lost at the front wheels, vehicle speed will drop and power and torque shall automatically be transferred to the rear axle. With a manually controlled range-selector valve the power transfer would be accomplished by having the operator downshift into the low range as soon as he sensed loss of traction.

FIGURE 7 is an enlarged sectional view illustrative of either the brake control valve or of the pressure modulating valve, as the two valves are identical in construction. Pressure modulating valve 52 is chosen for structural disclosure purposes.

These valves are intended to provide for a variable restriction of hydraulic fluid flow to the wheel driven motors though for directly opposed reasons. The brake control valve 136 regulates pressure in the exhaust circuitry and serves as a means of providing for torque reversal at the motors, whereas the pressure modulating valve 52 regulates maximum pressure in the intake circuitry. Effects upon the system due to depression of the individual control pedals 54 and 56 will be related separately and subsequent to this description of valve components.

Valve 52 comprises a housing 137 having a side inlet port 138 to which conduit 65 is connected for delivering hydraulic fluid at the pressure of pump 16. A single sleeve 139 is longitudinally slidably mounted in stepped bore 140, 141 and is normally biased to the illustrated position by spring 142.

A spool valve unit 143 has its stem connected to be operated by pedal 56 (FIGURES 3-5) its body 145 longitudinally slidably mounted within sleeve 139 and formed with a spool 144 spaced from body 145 by a reduced section 146 to define chamber 147.

Chamber 147 is surrounded by an annular cavity 148, and a series of three slots milled circumferentially around and through the wall of sleeve 139, the slots serving to connect chamber 147 to the cavity. Inlet port 138 is connected into chamber 147 by an opening 151 which exists between the edge of surface 159 of spool 144 and the edge of surface 153 of sleeve 139. Thus fluid under pressure enters inlet port 138 flowing around spool 144 in cavity 148 and through the slots 149 and opening 151 into chamber 147, leaving the valve at 154 through a series of three slots also milled into the wall of sleeve 139 in a manner similar to the slots 149. As will subsequently be explained the horizontal movement of foot pedal controlled spool 144 and sleeve 139 (which define opening 151) meters flow of fluid through the valve.

It will be noted that axially opposed annular sleeve surfaces 152 and 153, which appear in the skeleton portion of the sleeve adjacent the annular cavity, are of different area, the outside diameter of surface 152 being less than the outside diameter of surface 153. These surfaces are created during the milling operation which forms the slots at 149; but note that the axially opposed sleeve surfaces at slots 154 have *identical* outside diameters.

Depression of foot pedal 56 will move spool 144 to the right thereby reducing the cross-sectional area of opening 151. This tends to reduce fluid flow out of conduit 65 through the valve to drainport 94 causing an increase of pressure in conduit 65 which is transmitted back into the system. This pressure increase is sensed as a force at the differential sleeve surfaces 152 and 153 which causes sleeve 139 to also move to the right in FIGURE 7 compressing spring 142 until the moving force acting upon sleeve surface 153 is balanced by the spring reaction. By this means the hydraulic forces acting upon the pedal-controlled valve are always balanced so that pedal pressure can always be adjusted for operator convenience. In effect then the valve can be considered as a variable positioned opening through which high fluid pressures can be controlled by controlling the horizontal movement of spool 144 and of sleeve 139 against spring 142 over a reasonable length of valvespool movement. It is essential that the length of this movement of the valvespool which is mechanically linked to foot pedal 56 be reasonably long (at least one inch) in order to prevent the control means available to the operator from being too sensitive. Also note that the difference between the outside diameters of the two axially opposed surfaces 152 and 153 of sleeve 139 is very small, approximately 0.016 inch in the prototype vehicle, because of the high pressures (3000 to 6000 lbs./sq. in.) which will be sensed by these two surfaces. This is essential if the spring size is to be kept within reasonable limits and to prevent the control means available to the operator from being too stiff.

To this point the above description of valve components is identical whether for the brake control valve or for the pressure modulating valve. It is in the system's reaction to the described rise in system pressure (due to the physical location of these two valves with respect to the motors) that the effects of depressing the brake pedal and pressure modulating pedal differ. These effects upon the system will now be discussed.

With particular reference now to FIGURE 3, depression of foot pedal 54 as previously explained, causes pressure to rise in exhaust conduit 90. The rising pressure existing on the exhaust side of the motors will increase until there is a reversal of the pressure differential between the intake and exhaust lines of the motors, i.e. the exhaust line will possess a higher pressure than the intake lines. As a result the hydraulic motors begin to act as pumps injecting energy into the system which acts as a resistance, or torque reversal, at the wheels which can be linearly increased as brake pedal 54 is further depressed. Fluid then flows primarily from the sump through drainport 94 to the fixed motors in the low range, and through drainport 95 to the fixed motors in the high range. Thus it is noted that all braking energy is developed by the fixed motors, and as will later be shown, by only one pair of transversely aligned fixed motors at any given time, which pair it is being dependent on whether the vehicle is in forward or reverse.

Assuming the pump and fixed motors to have the same displacement capacity, the volume of fluid moved by a pair of fixed motors is approximately twice as large during braking as that which the pump can normally provide for drive purposes. This provides for a braking system which can theoretically absorb twice the energy output of the engine driven pump, the oil absorbing the drive energy as heat. This generated heat is removed from the oil by the heat exchanger. Note that because of the fluid flow series connection between the four wheels, the braking system is a four wheel system which like the drive system is traction responsive to prevent locking or skidding of the wheels. Also note that the ratio of motor fluid displacement to pump fluid displacement can be made larger, should this be desirable, by simply increasing the size of the motors relative to the pump size. Thus where the fixed motor displacement is 1½ times as large as the fluid displacement capacity of the pump the braking system would be capable of absorbing three times the energy developed by the pump.

Again assuming a 1:1 ratio between motor and pump displacements, the ratio of braking energy capacity to developed drive energy is not six as one might expect where the system utilizes six motors. As previously indicated the ratio will be approximately 2:1, as at any given instant when braking, only one pair of transversely aligned fixed motors is developing braking energy. The other pair of transversely aligned fixed motors do not provide additional braking capacity because of the series fluid flow connection between diagonally opposed fixed motors. The variable motors, being pressure responsive only, have their swashplates positioned to the minimum stroke angle by the pressure differential reversal between the exhaust and intake lines which in effect minimizes the value of the variable motors as a source of braking energy. Thus only one pair of transversely aligned fixed motors is available for providing braking capacity, but this is sufficient to make available an extremely efficient fast braking system effective down to zero vehicle speed and which eliminates the need for the usual service brakes.

With particular reference to FIGURE 5, pressure modulating pedal 56, which is mechanically linked with the engine throttle (by means not shown) serves the dual purpose of modulating system pressure and of regulating engine torque and vehicle speed. Depression of foot pedal 56 causes system pressure within conduits 74 and 86 to rise, and because of the dual control feature causes the engine throttle opening to increase so that the pressure increase will be substantially proportional to the additional torque developed by the engine. Thus system pressure is controlled by the interaction of the load at the wheels and the positioning of the pressure modulating pedal by the vehicle operator. With the load constant, the vehicle with more torque available at the wheels will accelerate. With the load varying and evidenced as additional drag at the wheels, the additional torque is made available to enable the vehicle to perform its work functions. Thus the pressure modulating valve and pedal control provides the vehicle operator with a means of controlling vehicle and engine speed and a means of regulating power and torque output at the wheel motors under varying load conditions.

As previously mentioned, braking resistance is linearly related to depression of the brake foot pedal. Similarly available system pressure and developed torque are linearly related to depression of the pressure modulating foot pedal. These linear relationships, vital if the operator is to be provided with a positive means of controlling braking, accelerating and torque output, are made possible by the novel design of the brake and pressure modulation valves as shown in FIGURE 7 wherein the following relationships exist:

(1) The maximum available system pressure is directly related to the displacement of valvespool 144 from its minimum pressure position;

(2) The maximum available system pressure is directly related to the movement of sleeve 139 from its minimum pressure position;

(3) The force differential, the force which compresses spring 142, and the spring's reactive force are equal and opposite; thus forces acting on sleeve 139 are always balanced.

Producing the force differential and developing the equal but directly opposing (spring reactive) force is a very important part of the invention in the two control valves as it means that the valve components and system pressure can assume a series of linearly related steady state operating points directly related to valve spool movement. This provides a stepless, but positive, means of controlling braking, accelerating and torque output which can be made available to the operator through the foot pedals by merely providing a mechanical linkage which establishes a linear relationship between depressions of the foot pedal and movement of piston within bore.

The relationship can be made non-linear, should it be so desired by providing a non-linear mechanical linkage between the foot pedal and piston; or by use of such springs as Belleville springs which develop reactive forces not linearly related to their compressive deflections.

In operation of the vehicle, with the valve 60 set in either forward or reverse, and the valve 58 set in either high or low position, the operator may manually control the torque available to the wheel motors by regulation of the depression of pedal 56 to increase or decrease the system pressure downstream of valve 52. Similarly instant braking may be effected by depression of the pedal 54 to increase the fluid pressure in the exhaust lines from the wheel motors to produce torque reversal. When the vehicle is at rest with the valve 60 in the FIGURE 4 brake position, the hydraulic fluid locked in the wheel motor system prevents the vehicle from moving.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by Letters Patent is:

1. In a hydrostatic transmission system for a vehicle having a source of fluid pressure and provided with two longitudinally spaced sets of transversely aligned ground engaging drive wheels, individual fluid pressure motors at each of said wheels, conduit means between said source and said motors for supplying motive fluid to all of said wheel motors, and compensating means in said conduit means for maintaining substantially equal torque to each pair of transversely aligned ground engaging drive wheels.

2. In the hydrostatic transmission defined in claim 1, said conduit means comprising cross conduits connecting the diagonally disposed motors in series, and said compensating means comprising a restricted passage between said cross conduits.

3. In the hydrostatic transmission defined in claim 2, said restricted passage comprising a branch conduit extending between said cross conduits and orifice means in said branch conduit.

4. In a hydrostatic transmission system for a vehicle having a source of fluid pressure and provided with two longitudinally spaced sets of transversely aligned ground engaging drive wheels, fixed capacity fluid pressure motors at each of said wheels, variable capacity fluid pressure motors at the wheels of one set only, conduit means between said source and said motors for supplying motive fluid at substantially source pressure to said motors, and valve means in said conduit means for selectively applying said fluid pressure to a selected pair of transversely aligned fixed capacity motors and to said variable capacity motors, or only to the variable capacity motors.

5. In the hydrostatic transmission defined in claim 4, said valve means also being adapted to selectively block said conduit means to prevent supply of said fluid pressure to any of said motors.

6. In a hydrostatic transmission system for a vehicle having a source of fluid pressure and provided with two longitudinally spaced sets of transversely aligned ground engaging drive wheels, individual fluid pressure motors at each of said wheels, conduit means between said source and said motors for supplying motive fluid in response to the torque requirements at said wheel set motors and providing a return path for said fluid to a reservoir at said source, and an operator controlled valve in said return path for varying the system pressure.

7. In the hydrostatic transmission defined in claim 6, said valve being connected to a manual control member accessible to the operator and effective upon predetermined restriction of said return path to increase the system exhaust pressure sufficiently to reverse the pressure differential across said motors.

8. In the hydrostatic transmission defined in claim 6, a manually controlled member accessible to the operator effective to restrict the conduit means between the source and the reservoir to increase the available system pressure to increase the drive torque of said motors.

9. In a hydrostatic transmission system for a vehicle having a source of fluid pressure and provided with two longitudinally spaced sets of transversely aligned ground engaging drive wheels, fixed capacity fluid pressure motors at each of said wheels, variable capacity fluid pressure motors at the wheels of one set only, conduit means between said source and said motors for supplying motive fluid at substantially source pressure to said wheel set motors and a range selector valve in said conduit assembly shiftable between a low speed position where it connects substantially source pressure to one or the other pair of transversely aligned fixed capacity motors and to the variable capacity motors and a high speed position where it connects said source to only said one set of said motors.

10. In the hydrostatic transmission defined in claim 9, said range selector valve having a third position where it blocks said source from communication with any of said wheel motors.

11. In the hydrostatic transmission defined in claim 9, a vehicle direction selector valve assembly interposed in said conduit means between said range selector valve and said motors, said direction selector valve being shiftable between forward and reverse positions wherein it reverses the direction of fluid flow through all the motors.

12. In the hydrostatic transmission defined in claim 11, said direction selector valve having a braking position wherein it blocks supply and exhaust fluid communication for all of said wheel motors.

13. In the hydrostatic transmission defined in claim 9, a supply pressure modulating valve in said conduit means between the source and said reservoir, and a manual control member therefor accessible to the operator of the vehicle.

14. In the hydrostatic transmission defined in claim 9, return conduit means connecting said motors to a reservoir at said source, and a braking control valve in said return conduit means having a manual control member accessible to the operator of the vehicle.

15. In a hydrostatic transmission system for a vehicle having a source of fluid pressure and provided with two longitudinally spaced sets of transversely aligned ground engaging drive wheels, a first group of individual fluid pressure motors, one disposed at each of said wheels and connected to drive those wheels, a second group of individual fluid pressure motors disposed only at one set of said wheels and drive connected to said one set of wheels, conduit means between said source and said motors for supplying motive fluid to said wheel set motors, and valve means in said conduit means for selectively connecting said source fluid to drive all motors or the second group of motors.

References Cited by the Examiner

UNITED STATES PATENTS

| | | | |
|---|---|---|---|
| 2,748,879 | 6/1956 | Bailey | 180—49 X |
| 2,996,135 | 8/1961 | Grabow | 180—44 |
| 3,151,694 | 10/1964 | Rogers | 180—66 X |
| 3,256,950 | 6/1966 | De Biasi | 180—44 |

EDGAR W. GEOGHEGAN, *Primary Examiner.*